Dec. 14, 1965 H. LESSOFF ETAL 3,223,641

SQUARE LOOP MOLYBDENUM MODIFIED FERRITES

Filed Aug. 28, 1963

INVENTORS
HOWARD LESSOFF &
EUGENE G. FORTIN
BY
W. S. Hill
AGENT

United States Patent Office 3,223,641
Patented Dec. 14, 1965

3,223,641
SQUARE LOOP MOLYBDENUM MODIFIED FERRITES

Howard Lessoff, Needham, and Eugene G. Fortin, Norwood, Mass., assignors to Radio Corporation of America, a corporation of Delaware Filed Aug. 28, 1963, Ser. No. 305,236
8 Claims. (Cl. 252—62.5)

Figure 1:
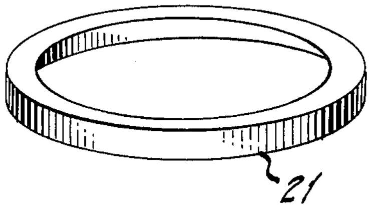

This is a continuation-in-part of patent application Serial No. 165,812, filed January 12, 1962, now abandoned, by the same applicants hereof and assigned to the same assignee as this application.

This invention relates to a ferromagnetic ferrite core which exhibits a substantially square hysteresis loop, a relatively high Curie temperature, and a relatively low coercive force. The invention relates also to a method of manufacture thereof. The ferrite core of the invention may be used as an element in coincident current memories of digital electronic computers and in other electronic apparatus. The terms "core" and "body" are used interchangeably in this document to refer to a sintered mass of ferrite particles.

There have been proposed ferrite cores which exhibit a substantially square hysteresis loop and which consist essentially of a lithium-manganese ferrite. By "square" hysteresis loop" is meant that the core exhibits a squareness ratio $R_s$ of at least 0.70. Certain of these ferrite cores exhibit a Curie temperature greater than 590° C., which is relatively high compared with previous ferrite cores. A ferrite core having a relatively high Curie temperature is desirable in applications where there is a high ambient temperature. In many cases, such high Curie temperature cores obviate the need for heat-removal and temperature-controlling auxiliary equipment.

Further improvements to these high Curie temperature cores are desirable particularly in providing also more uniform magnetic characteristics over a longer operating temperature range and a lower coercive force.

An object of this invention is to provide an improved ferromagnetic ferrite body.

Another object is to provide an improved method for fabricating a ferromagnetic ferrite body.

A further object is to provide an improved ferromagnetic ferrite core which exhibits a substantially square magnetic hysteresis loop, relatively high Curie temperature, and a relatively low coercive force.

In general, the improved magnetic core of the invention has a squareness ratio $R_s$ of at least 0.7 and has the molar composition $Li_{0.5}Mn_wMe_xMo_zFe_yO_4$, where Me is at least one member of the group consisting of Cd, Zn, and Mg, $w$ is between 0.00 and 0.15, $x$ is between 0.00 and 0.05, $y$ is between 2.35 and 2.60, and $z$ is between 0.005 and 0.02.

The magnetic core of the invention is formed by calcining in an oxidizing atmosphere at temperatures between 800 and 1000° C. a mixture of compounds containing, in the following relative molar proportions, 0.5 mol Li, 0.00 to 0.15 mol Mn, 2.35 to 2.60 mol Fe, 0.005 to 0.02 mol Mo, and 0.00 to 0.05 mol of at least one member of the group consisting of Cd, Zn and Mg. A quantity of the calcine is shaped to form a core. The core is sintered at between 1050 and 1190° C. in an atmosphere which consists essentially of oxygen gas and between 0 and 99 volume percent of at least one neutral gas. The core is then cooled.

Figure 2:
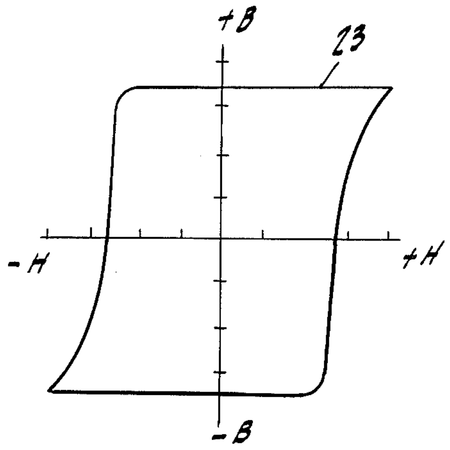

The invention is described in greater detail in the following specification which refers to the accompanying drawing in which:

FIGURE 1 is a typical magnetic core of the invention in the shape of a toroid, and FIGURE 2 is a hysteresis loop for a typical toroidal magnetic core of the invention.

EXAMPLE 1

A magnetic core of the invention may be prepared by the following procedure. Mix a batch of the following ingredients:

| Molar parts: | Ingredient |
|---|---|
| 0.5 | Li, as lithium carbonate $Li_2CO_3$, Mallinkrodt CP powder. |
| 0.04 | Mn, as $MnCO_3$, Baker's analyzed reagent grade. |
| 0.01 | Mo, as $MoO_3$, Baker's analyzed reagent grade. |
| 2.45 | Fe, as Mapico Red $Fe_2O_3$, No. 110–2. |

The batch is attrited in ethyl alcohol for about two hours and then dried and screened. The attrited mixture is calcined for about four hours in air at about 900° C. The calcined batch is attrited in ethyl alcohol for about two hours and then dried. About three percent by weight of a suitable organic binder is evenly dispersed through the dry calcined batch. One suitable binder is Flexalyn in methyl ethyl ketone, which is marketed by the Hercules Powder Company, Wilmington, Delaware. The calcined batch with the binder added is screened through an 80 mesh screen. The screened calcined batch is then pressed into toroidal cores. The pressed cores are then sintered for about 8 hours at about 1100° C., in an atmosphere containing 80 parts by volume of nitrogen gas and 1 part by volume of oxygen gas. The sintered cores are cooled to about 1000° C. and annealed for about four hours at this temperature in an atomsphere containing five parts by volume of nitrogen gas and one part by volume of oxygen gas. After annealing, the cores are cooled to room temperature in the annealing atmosphere.

EXAMPLE 2

A magnetic core of the invention may be prepared by the following procedure. Mix a batch of the following ingredients:

| Molar parts: | Ingredient |
|---|---|
| 0.5 | Li, as lithium carbonate $Li_2CO_3$. |
| 0.04 | Cd, as cadmium oxide CdO. |
| 0.01 | Mo, as molybdenum oxide $MoO_3$. |
| 2.47 | Fe, as ferric oxide, $Fe_2O_3$. |

The batch is mixed, calcined, and formed into a core as described in Example 1. The pressed cores are then sintered for about 8 hours at about 1125° C. in an atmosphere of pure oxygen gas. The sintered cores are cooled at the rate of about 50° C. per hour in an atmosphere of flowing oxygen to about 700° C., and then cooled to room temperature.

FIGURE 1 illustrates a toroidal core 21 prepared according to the examples. A typical sintered toroidal core has about the following dimensions:

| | Inch |
|---|---|
| Outside diameter | 0.080 |
| Inside diameter | 0.050 |
| Thickness | 0.025 |

FIGURE 2 illustrates a typical hysteresis loop exhibited by a core prepared according to the examples. In FIGURE 2, magnetization B is plotted against magnetizing force H. Other characteristics of the core 21 of the examples are tabulated in Table 1.

The following compositional and procedural variations may be made from that set forth in the examples. The range of molar composition of the cores of the invention is: $Li_{0.5}Mn_wMe_xMo_zFe_yO_4$, where Me is at least one member of the group consisting of Cd, Zn, and Mg. Me may consist of any combination of members of this group. The value of $w$ may be between 0.00 and 0.15. The value of $x$ may be between 0.00 and 0.05. The value of $y$ may be between 2.35 and 2.60. The value of $z$ may be between 0.005 and 0.02.

The batch may be compounded of the constituent metal oxides or of compounds which yield the constituent metal oxides by chemical reaction during the calcining of the batch or during the sintering of the core. Typical compounds may be, for example, carbonates, oxides, or acetates of the constituent metals. A high degree of purity is desirable, preferably the "chemically pure" grade of chemicals.

In the examples, the steps of mixing, attriting drying, and screening are designed to provide an intimate mixture of the ingredients, and to remove gasses, water, and volatile organic matter contained in the batch. These steps are not critical. Any procedure which provides a dry, intimate mixture of the ingredients is satisfactory.

In the example, the calcining step is important. The calcining temperature may be between 800° and 1000° C., but is preferably near the middle of the range. The calcining time is not critical, although shorter times are preferred with higher calcining temperatures. Air is the preferred calcining atmosphere. Other atmospheres having oxidizing characteristics similar to that of air at the calcining temperature may also be used.

In the examples, attriting the calcine, addition of a binder, screening, and pressing are not critical to the magnetic properties of the final product; however, a proper selection should be made to obtain the desired shape and size of product with a minimum distortion. Besides toroidal cores, other shapes including multiaperture magnetic cores, such as magnetic memory aperture plates and transfluxor cores may be prepared. See a description of ferrite core fabrication processes in G. S. Hipskind et al., "Processing and Testing Rectangular Loop Cores," RCA Engineer, volume II, No. 6, 1957, pages 9 to 13.

The sintering temperature may be between 1050° and 1190° C. The sintering temperature affects the coercivity of the core and grain size of the crystallites which constitute the core. Generally, the higher the sintering temperature, the lower the coercivity of the core and the larger the grain size of the crystallites. Using the process of Example 2, cores may be made having a coercivity between 2.0 and 2.4 oersteds by selecting the sintering temperature between 1050° and 1190° C.

The sintering time may be between 1 and 24 hours. The sintering time also affects the coercivity of the cores. Generally, the longer the sintering time, the lower the coercivity of the core. Using the process of Example 2, cores may be made having a coercivity between 1.7 and 2.6 oersteds by selecting the sintering time between 1 and 16 hours.

Annealing takes place during cooling at temperatures between 700° and 1100° C. The annealing time may be between 1 and 10 hours. The cooling rate of the core down to 700° C. affects the squareness ratio of the core. Generally, the faster the cooling rate, the lower the squareness ratio $R_s$. Using the process of Example 2, cores may be made having a squareness ratio $R_s$ between 0.90 and 0.72, by selecting the cooling rate between 50° C. per hour and quenching.

The sintering atmosphere and the annealing atmosphere are important. The cores may be sintered in an atmosphere consisting essentially of oxygen gas or a mixture of a neutral gas and oxygen gas. In the sintering atmosphere, the volume ratio of neutral gas to oxygen gas may be between a ratio of 0/1 and a ratio of 99/1. The cores may be annealed in an atmosphere consisting essentially of a mixture of a neutral gas and oxygen gas or of oxygen gas alone. In the annealing atmosphere, the volume ratio of neutral gas to oxygen may be between a ratio of 0/1 and a ratio of 6/1. Some suitable neutral gases for both the sintering step and the annealing step are nitrogen, argon, neon, helium, and mixtures thereof.

Alternative to carrying out the sintering and annealing in one firing operation as described above, the cores described herein may be prepared by sintering in an atmosphere as described above, cooling to room temperature, then refiring in an atmosphere as described above to anneal the cores, and finally cooling again to room temperature. Magnetic cores with similar characteristics to the cores of the examples are produced by this two-fire process.

Where the cores are prepared by the two-fire process, the annealing or refiring temperature affects the squareness ratio $R_s$ and the switching time $T_s$ of the core. Generally, the higher the annealing temperature, the higher the squareness ratio $R_s$ and the longer the switching time. For example, by adding a refiring step to the process of Example 2, it was found that raising the annealing temperature from 800° C. to 1100° C., raises the squareness ratio from about 0.89 to about 0.92 and changes the switching time $T_s$ from about 0.79 microsecond to 0.90 microsecond.

Tables 1 and 2 tabulate some of the properties of some cores in the compositional system of the invention. Table 1 has the following data: Curie temperature $T_c$ in ° C., coercive force $H_c$ in oersteds, and squareness ratio $R_s$. Table 1 tabulates additional examples of cores prepared by the method of Example 1, but differing from one another only in composition. The first item in Table 1 contains no molybdenum and is included for comparision purposes. The other cores of Table 1 exhibit a lower coercive force $H_c$ and a lower drive current $I_m$ with little or no sacrifice in the other properties set forth. The Curie temperature $T_c$ is above 590° C. for all of the cores. An additional advantage is that the useful temperature range for these cores is between about −50° C. and 200° C. This range is to be compared with memory cores now in commercial use where the useful operating temperature range is between 0° C. and 100° C.

Table 2 tabulates additional examples of cores prepared by the method of Example 2 but differing in at least one of sintering time, sintering temperature, and cooling rate.

*Table 1*

[$Li_{0.5}Mn_wMe_xMo_zFe_yO_4$]

| $w$ | Me | $x$ | $y$ | $z$ | $T_c$ | $H_c$ | $R_s$ |
|---|---|---|---|---|---|---|---|
| 0.05 | ---------- | 0.00 | 2.46 | 0.00 | 615 | 2.5 | .82 |
| 0.14 | ---------- | 0.00 | 2.35 | 0.01 | -------- | 1.6 | .72 |
| 0.09 | ---------- | 0.00 | 2.40 | 0.01 | -------- | 1.3 | .92 |
| 0.04 | ---------- | 0.00 | 2.45 | 0.01 | 630 | 1.6 | .93 |
| 0.04 | ---------- | 0.00 | 2.46 | 0.01 | 632 | 1.5 | .92 |
| 0.04 | ---------- | 0.00 | 2.50 | 0.01 | 625 | 1.4 | .92 |
| 0.00 | Cd | 0.04 | 2.45 | 0.01 | 610 | 1.5–2.0 | .89 |
| 0.00 | Cd | 0.01 | 2.58 | 0.01 | 605 | 1.9 | .89 |
| 0.00 | Zn | 0.01 | 2.45 | 0.01 | 615 | 1.7 | .85 |
| 0.00 | Zn | 0.04 | 2.45 | 0.01 | 600 | 1.4 | .74 |

*Table 2*

[$Li_{0.5}Cd_{0.04}Mo_{0.01}Fe_{2.47}O_4$]

| Sintering Temperature, ° C. | Sintering Time, hours | Cooling Rate, °C./hr. | $H_c$, oe. | $R_s$ |
|---|---|---|---|---|
| 1,125 | 4 | 50 | 2.1 | 0.92 |
| 1,125 | 8 | 50 | 2.0 | 0.88 |
| 1,125 | 16 | 50 | 1.7 | 0.92 |
| 1,150 | 8 | 50 | 2.2 | 0.89 |
| 1,150 | 8 | 100 | 2.2 | 0.88 |
| 1,150 | 8 | 200 | 2.2 | 0.83 |
| 1,150 | 8 | quench | 2.1 | 0.71 |

What is claimed is:

1. A magnetic core having a squareness ratio $R_s$ of at least 0.7 and the molar composition:

$$Li_{0.5}Mn_wMe_xMo_zFe_yO_4$$

where:

Me is at least one member of the group consisting of Cd, Zn, and Mg
$w$ is between 0.00 and 0.15
$x$ is between 0.00 and 0.05
$y$ is between 2.35 and 2.60
$z$ is between 0.005 and 0.02.

2. A magnetic core having a squareness ratio $R_s$ of at least 0.7 and the molar composition:

$$Li_{0.5}Me_xMo_zFe_yO_4$$

where:

Me is at least one member of the group consisting of Cd, Zn, and Mg
$x$ is between 0.00 and 0.05
$y$ is between 2.35 and 2.60
$z$ is between 0.005 and 0.02.

3. A magnetic core having a squareness ratio $R_s$ of at least 0.7 and the molar composition:

$$Li_{0.5}Cd_xMo_zFe_yO_4$$

where:
$x$ is greater than 0.00 and up to 0.05
$y$ is between 2.35 and 2.60
$z$ is between 0.005 and 0.02.

4. A magnetic core having a squareness ratio $R_s$ of at least 0.7 and the molar composition:

$$Li_{0.5}Zn_xMo_zFe_yO_4$$

where:

$x$ is greater than 0.00 and up to 0.05
$y$ is between 2.35 and 2.60
$z$ is between 0.005 and 0.02.

5. A magnetic core having a squareness ratio $R_s$ of at least 0.7 and the molar composition:

$$Li_{0.5}Mg_xMo_zFe_yO_4$$

where:

$x$ is greater than 0.00 and up to 0.05
$y$ is between 2.35 and 2.60
$z$ is between 0.005 and 0.02.

6. A magnetic core having a squareness ratio $R_s$ of at least 0.7 and having the molar composition:

$$Li_{0.5}Mn_wMo_zFe_yO_4$$

where:

$w$ is greater than 0.00 and up to 0.15
$y$ is between 2.35 and 2.60
$z$ is between 0.005 and 0.02.

7. A magnetic core having a squareness ratio $R_s$ of at least 0.7 and having the molar composition:

$$Li_{0.5}Mo_zFe_yO_4$$

where:

$y$ is between 2.35 and 2.60
$z$ is between 0.005 and 0.02.

8. A method for preparing a magnetic core having a squareness ratio of at least 0.7 comprising calcining in an oxidizing atmosphere a mixture of compounds containing, in the following relative molar proportions, 0.5 mol Li, 0.0 to 0.15 Mn, 2.35 to 2.60 mol Fe, 0.005 to 0.02 mol Mo, and 0.00 to 0.05 mol of at least one member of the group consisting of Cd, Zn, and Mg, shaping a quantity of said calcined mixture to form a core, sintering said core at temperatures between 1050° and 1190° C. for between 1 and 24 hours in an atmosphere which consists essentially of oxygen gas and between 0 and 99 volume percent of at least one neutral gas, and then cooling said sintered core.

References Cited by the Examiner

UNITED STATES PATENTS

| | | | |
|---|---|---|---|
| 2,981,689 | 4/1961 | Albers-Schoenberg | 252—62.5 |
| 2,987,481 | 6/1961 | Brownlow | 252—62.5 |
| 3,009,880 | 11/1961 | Lessoff | 252—62.5 |
| 3,034,987 | 5/1962 | Baltzer | 252—62.5 |

TOBIAS E. LEVOW, *Primary Examiner.*

MAURICE A. BRINDISI, *Examiner.*